...

United States Patent Office 3,428,607
Patented Feb. 18, 1969

3,428,607
PROCESS FOR THE PREPARATION OF FINELY DIVIDED, INSOLUBLE AND INFUSIBLE MELAMINE-FORMALDEHYDE CONDENSATION PRODUCTS
Alfred Renner, Allschwil, Switzerland, assignor to Ciba Limited, Basel, Switzerland, a company of Switzerland
No Drawing. Filed Jan. 11, 1966, Ser. No. 519,963
Claims priority, application Switzerland, Feb. 12, 1965, 1,964/65
U.S. Cl. 260—67.6     12 Claims
Int. Cl. C08g 9/30, 53/02

ABSTRACT OF THE DISCLOSURE

A process for the preparation of finely divided infusible and insoluble melamine-formaldehyde condensation products of mean particle size below 1 micron, characterized by reacting—preferably at an elevated temperature—an aqueous solution of melamine and formaldehyde, preferably having a molar ratio of 1.5 to 6 mols of formaldehyde per 1 mol of melamine, or an aqueous solution of a precondensate of melamine and formaldehyde, in the presence of a protective colloid, in the pH range of 6.0 to 8.0, until a solid phase is formed. The products are useful as reinforcing fillers in natural and synthetic rubbers and in thermoplastics.

---

The subject of the present invention is a process for the preparation of finely divided infusible and insoluble melamine-formaldehyde condensation products of mean particle size below 1 micron, characterized by reacting—preferably at an elevated temperature—an aqueous solution of melamine and formaldehyde, preferably having a molar ratio of 1.5 to 6 mols of formaldehyde per 1 mol of melamine, or an aqueous solution of a precondensate of melamine and formaldehyde, in the presence of a protective colloid, in the pH range of 6.0 to 8.0, until a solid phase is formed.

In general, the precipitate obtained is isolated in a known manner, then dried and deagglomerized. However, it may also be of advantage for certain applications in aqueous systems, e.g. as textile matting agents, if the precipitates are used directly in the form in which they are produced.

The process of the invention yields powdery solids of mean particle sizes which are generally far below 1 micron. These solids are outstandingly suitable for use as reinforcing fillers of natural and synthetic rubber and thermoplastics, as e.g. polyethylene, as fillers for thermosetting plastics, and furthermore as matting agents for textiles and as thickening and thixotropizing agents. The finely divided resin powders produced according to the invention are white, stable to light, have a low bulk density and also possess a lower specific gravity ($d_{20}=1.46$) than inorganic solids such as e.g. silica gel, titanium dioxide or calcium carbonate. They are largely stable to heat, water, alkalies, acids and solvents, and are physiologically acceptable.

Instead of formaldehyde one of its polymers such as paraformaldehyde or other formaldehyde donors may of course be used, in a known manner.

The properties of the finely divided resin powders may optionally be modified to adapt the properties to certain end uses, by co-condensation with other materials participating in the resin formation. The possibilities particularly include a partial replacement of melamine by another aminoplast-forming substance, and also a partial replacement of formaldehyde by other aldehydes.

Suitable aminoplast-forming substances that may partially replace melamine are: urea, thiourea, guanidine, dicyandiamide and dicyandiamidine, as well as alkylureas and cyclic alkylene-ureas, and aminotriazines other than melamine, such as melam, melem, ammelide and ammeline, substituted melamines, such as butyl- or phenyl-melamine, as well as guanamines such as acetoguanamine, benzoguanamine, tetrahydrobenzoguanamine and stearo-guanamine.

Suitable aldehydes that may partially replace formaldehyde or its polymers include e.g.: acetaldehyde, (iso)-butyraldehyde, acrolein, crotonaldehyde, furfural and glyoxal.

For specific applications as e.g. for rubber reinforcement, the melamine-formaldehyde condensation products may, however, also be modified with the following other co-condensable substances: low aliphatic alcohols such as methanol, ethanol or butanol; phenols and alkylphenols, such as phenol, resorcinol, bisphenol A, cresols, or xylenols; amides of saturated and unsaturated aliphatic carboxylic acids, and CH-acid compounds as e.g. ethyl acetoacetate and some sulphur compounds such as ammonium thiocyanate, ammonium sulphide and thioformaldehyde.

An important characteristic of the invention is the presence of a protective colloid during the precipitation of the melamine-formaldehyde condensation product. By protective colloid is to be understood a macromolecular, water-soluble, organic substance which may also have a polyelectrolyte character. Examples of such protective colloids are natural substances such as starch, gelatine, glue, tragacanth and agar-agar, modified natural substances such as the alkali metal salts of carboxymethyl-celluloses or alkali metal alginates; synthetic high polymers such as polyvinyl alcohol, polyvinyl pyrrolidone; akali metal salts of polyacrylic acid, polymethacrylic acid, and copolymers of acrylic and methacrylic acid; salts of copolymers of maleic acid; polyhydrochlorides of homo-polymers or copolymers of vinylpyridine. The concentration of the protective colloid necessary to achieve a finely divided precipitate depends upon the type of protective colloid, its molecular weight and the concentration of the resin-forming substances. It may be varied wide limits, for example between 0.01% and 10%, relative to the total weight of the charge. High-molecular protective colloids, which can strongly increase the viscosity of aqueous solutions, are effective even in low concentrations. A higher concentration of the resin forming substances also necessitates a higher concentration of the protective colloid.

In order to carry out the process of the invention melamine and formaldehyde are advantageously reacted in a molar ratio of between 1.5 and 6, in aqueous solution. The aqueous solvent medium consists preferably of water alone, but it is also possible to use solvent mixtures which contain, in addition to water, other inert solvents that are compatible with water, e.g. low alcohols such as methanol. The protective colloid can be added from the start, and the resin forming substances may be reacted directly until a precipitate is formed (single stage process). It is, however, also possible, as is frequently practised in aminoplast chemistry, to first produce a pre-condensate of melamine and formaldehyde and/or other modifying substances, and allow this to react further at a constant pH-value, optionally after dilution, until a precipitate is formed; in this case, the addition of the protective colloid may take place after the formation of the precondensate (2 stage process).

Surprisingly, it has been found that the most finely divided precipitates are obtained at pH values between 6 and 8, but particularly between 6 and 7. Above pH=8 the tendency to form resin is very low (see e.g. A. Gams, G. Widmer, W. Fisch, Helv. Chim. Acta 24, 302–E–319

E [1941]). Below pH=6, there are generally obtained precipitates of inhomogeneous particle size distribution, with coarse components larger than 1 micron. Because of the pronounced dependence of the mean particle size on the pH a suitable pH-stabilization arrangement (consisting of a glass electrode, pH-measuring equipment and automatic burette) is appropriate. Such a technique is to be preferred to the use of buffer substances since the latter would have to be washed out after precipitation is complete.

The precipitation may be carried out in dilute to moderately concentrated solutions. Above 25%, the reaction mixture is very thick and difficult to stir and homogenize. Concentrations of the risen-forming substances between 5 and 25% by weight are therefore preferred.

The boiling temperature of the reaction medium has proved to be the best precipitation temperature. Precipitation below the boiling temperature is also possible but longer reaction times have to be accepted if good yields are desired. Precipitation above 100° C., under pressure, requires special equipment.

The precipitates are best isolated by filtration or centrifugation. A small addition of salts of multivalent metals, such as aluminium sulphate, frequently facilitates this operation. The precipitates are dehydrated by drying in a stream of air or azeotropically by means of benzene, toluene or the like, and are then dried. The deagglomerations may be achieved in known manner, by means of ball mills, impact mills or air jet mills.

The resin powders produced according to the process of the invention consists of approximately spherical individual particles. Their mean diameter Δ may be calculated from the specific surface area of the powder according to the equation:

$$\Delta\ [m\mu] = 4112/0_{spec.}[m.^2/g.]$$

This Δ value generally agrees well with particle size determination by electron microscopy.

In the following examples percentages denote percentages by weight. The pH-values are corrected to 20° C.

EXAMPLE 1

(a) Preparation of a precondensate

A mixture of 480 g. of a 30% aqueous formaldehyde solution and 4.8 g. of a 50% aqueous solution of monoethanolamine phosphate is adjusted to pH=6 by means of 2 N-NaOH. 151 g. of melamine are then added, the mixture is heated to 60° C. with stirring, and condensed at this temperature for 30 minutes. After the melamine has dissolved the pH value is 6.9.

(b) Precipitation

Reaction vessel is provided with a stirrer, a reflux condenser, a thermometer, a dropping funnel and a glass/calomel electrode pair which is connected with a pH-measuring equipment and a magnetic valve, which releases the inflow of 10% sulphuric acid when a pre-selected pH-value is exceeded.

490 ml. of $H_2O$ and 6 g. of a sodium salt of a carboxymethylcellulose, which has a viscosity of at least 1300 cp. in 1% aqueous solution, are first introduced.

This batch is heated until boiling gently, during the course of which the protective colloid dissolves. The automatic pH-control is set to pH=6.0. The precondensate prepared according to (a) is allowed to run in from the dropping funnel at such a rate that the temperature does not drop below 90° C. and the pH-value does not drop below 5.9. Towards the end of the addition of the precondensate a cloudiness forms and this soon intensifies to a precipitate. The mixture is allowed to react for another 16 hours at 90° C. and pH=6.0, then cooled to room temperature, filtered off, and the residue washed with water, dried at 80° C. until constant weight is achieved, and ground in a ball mill for 90 minutes.

201 g. of a white powder having a bulk density of 74 g./litre, a specific surface area of 83.2 $m.^2/g.^{-1}$, and a mean particle size of 49 millimicrons, are obtained.

EXAMPLES 2–4

Effect of the pH-value during the precipitation

The procedure is exactly as in Example 1 but the precipitation and the post-reaction are carried out at different pH-values:

TABLE I

| Example Number | pH | Yield, g. | Bulk density (g./litre) | Specific Surface Area ($m.^2/g.^{-1}$) | Mean particle Size (mμ) |
|---|---|---|---|---|---|
| 2 | 6.5 | 185 | 155 | 184.0 | 22 |
| 3 | 7.0 | 196 | 128 | 174.0 | 24 |
| 4 | 7.5 | 176 | 90 | 32.0 | 128 |

In Example 4 an equal amount of tragacanth was used instead of Na-carboxymethylcellulose.

EXAMPLES 5–9

Effect of various protective colloids

The procedure is the same as that described in Example 1 but instead of using sodium carboxymethylcellulose the protective colloids listed in Table II below are used. The precipitation and the post-reaction are carried out at pH=6.5.

TABLE II

| Example Number | Protective Colloid | G. | Yield, g. | Bulk Density (g./litre) | Specific Surface Area ($m.^2/g.^{-1}$) | Mean Particle Size (mμ) |
|---|---|---|---|---|---|---|
| 5 | Tragacanth | 6.0 | 183 | 189 | 77.6 | 53 |
| 6 | Starch | 25.0 | 214.9 | 164 | 41.0 | 100 |
| 7 | Gelatin | 25.0 | 226 | 225 | 118.0 | 35 |
| 8 | Agar-Agar | 25.0 | 195 | 204 | 92.0 | 45 |
| 9 | Polyvinyl alcohol | 25.0 | 210.7 | 283 | 60.8 | 68 |

EXAMPLES 10–14

Effect of the molar ratio of formaldehyde:melamine

In Example 10, which has a molar ratio formaldehyde: melamine=2, the following charges and process conditions were used;

(a) Precondensate:

|   | G. |
|---|---|
| Aqueous solution of $CH_2O$ (30%) | 240 |
| Aqueous solution of monobasic monoethanol amine phosphate (50%) | 2.4 |
| Melamine, 30 minutes, 60° C. and pH=6.9 | 151 |

(b) Precipitation at pH=6.5 and 90° C., in:

|   | G. |
|---|---|
| $H_2O$ | 5140 |
| Gelatin | 25 |

In other respects the procedure is as described in Example 1.

In the Examples 11–14 which follow, the amount of formaldehyde was increased to correspond to the higher molar ratios, and the amount of water decreased by the same amount in order to keep the concentrations constant. The charges and experimental results can be seen in Table III.

TABLE III

| Example Number | CH$_2$O 30% (g.) | H$_2$O (g.) | CH$_2$O/ Melamine | Yield (g.) | Bulk Density (g./litre) | Specific Surface Area (m.$^2$/g.$^{-1}$) | Mean Particle Size (m$\mu$) |
|---|---|---|---|---|---|---|---|
| 10 | 240 | 5,140 | 2 | 190 | 147 | 99.5 | 41 |
| 11 | 360 | 5,020 | 3 | 206.5 | 135 | 135 | 30 |
| 12 | 480 | 5,000 | 4 | 208 | 140 | 145 | 28 |
| 13 | 600 | 4,780 | 5 | 220.8 | 160 | 153 | 29 |
| 14 | 720 | 4,660 | 6 | 226 | 173 | 150 | 27 |

EXAMPLE 15

Single-stage process in concentrated solution 3640 g. of H$_2$O and 15 g. of a copolymer of maleic anhydride and styrene, the preparation of which is described below, are charged in and heated to boiling. The pH is set to 7.3 by means of 6.5 ml. of 24% aqueous ammonia, and 378 g. of melamine are added. The pH stabilization equipment is set to pH=6.5 and 1500 g. of an aqueous 40% formaldehyde solution are added dropwise at 90° C. During this phase, 2 N-NaOH has to be supplied from the automatic burette. 55 g. of 2N-NaOH are consumed. As soon as all formaldehyde has been added dropwise, a clear solution is obtained. After about 16 minutes at 90–95° C., a cloudiness appears which intensifies to a precipitate. The alkali burette is replaced by an acid burette (10% H$_2$SO$_4$). The reaction mixture now assumes the consistency of a thixotropic gel. The supply of acid is interrupted during this phase. The gel is stirred to a paste by means of a high speed stirrer, and allowed to react for another 16 hours at 90–95° C. and pH=6.5 to 6.6.

The mixture is then cooled to 25° C., centrifuged, dried at 80° C. in a stream of air, ground in a ball mill for 90 minutes, and sieved.

Yield _____ g__ 576.6
Bulk density _____ g./litre__ 300
Specific surface area _____ m.$^2$/g.$^{-1}$__ 111.5
Mean particle size _____ m$\mu$__ 37

The protective colloid used in this example is prepared as follows:

98 g. of maleic anhydride, 4.04 g. of dibenzoyl peroxide and 1325 ml. of toluene are heated to boiling, 104 g. of styrene are added dropwise, and the mixture is boiled for a further 3 hours. The polymer is then filtered off and dried at 80° C. to constant weight. Yield: 199.5 g.

What is claimed is:

1. Process for the preparation of finely divided infusible and insoluble melamine-formaldehyde condensation products of a mean particle size below 1 micron, which comprises heating an aqueous solution containing dissolved at least one resin-forming composition selected from the group consisting of (1) a mixture of melamine and formaldehyde and (2) a precondensate of melamine and formaldehyde, said aqueous solution further containing a protective colloid, and said aqueous solution being adjusted to a pH-range of 6.0 to 8.0, until a solid phase consisting of precipitated insoluble resin of a mean particle size below 1 micron is formed.

2. Process according to claim 1, wherein 1.5 to 6 mols of formaldehyde per mol of melamine are used.

3. Process according to claim 1, wherein the starting aqueous solution contains besides melamine and formaldehyde at least one other aminoplast-forming substance.

4. Process according to claim 1, wherein the aqueous solution contains a precondensate of melamine, formaldehyde and at least one other aminoplast-forming substance.

5. Process according to claim 1, wherein as the protective colloid an alkali salt of a high-molecular polycarboxylic acid is used.

6. Process according to claim 5, wherein the high-molecular polycarboxylic acid used as the protective colloid is a carboxymethylcellulose.

7. Process according to claim 5, wherein the high-molecular polycarboxylic acid used as the protective colloid is a hydrolyzed copolymer of maleic anhydride and styrene.

8. Process according to claim 1, wherein gelatin is used as the protective colloid.

9. Process according to claim 1, wherein the protective colloid is used in an amount of 0.01 to 10% by weight relative to the total amount of the aqueous reaction mixture.

10. Process according to claim 1, wherein the starting aqueous solution contains 5 to 25% by weight of resin-forming composition.

11. Process according to claim 1, wherein the precipitation reaction is carried out in the pH-range from 6.0 to 7.0.

12. Process according to claim 1, wherein the precipitation reaction is carried out at the boiling point of the aqueous reaction mixture.

References Cited

UNITED STATES PATENTS

| 2,192,129 | 2/1940 | Ellis | 260—17.3 |
| 2,306,924 | 12/1942 | Zerweck et al. | 260—67.6 |
| 2,487,766 | 11/1949 | Schmidt | 260—17.3 |
| 3,002,881 | 10/1961 | McDonnell et al. | 260—6 |
| 3,232,898 | 2/1966 | Van Loo | 260—29.4 |
| 3,251,800 | 5/1966 | Cooley et al. | 260—67.6 |
| 2,394,009 | 2/1946 | Pollard | 117—73 |
| 2,602,037 | 7/1952 | Nelb | 154—128 |
| 2,623,028 | 12/1952 | Love | 260—39 |
| 2,998,410 | 8/1961 | Jefts et al. | 260—67.6 |
| 3,117,106 | 1/1964 | Wohnseidler | 260—67.6 |

FOREIGN PATENTS

| 847,154 | 9/1960 | Great Britain. |
| 574,016 | 12/1945 | Great Britain. |

OTHER REFERENCES

Chem. Abstract, 64: 3777b, Nopco Chemical Co., "Porous Substrate Treatment."

WILLIAM H. SHORT, *Primary Examiner*.

E. WOODBERRY, *Assistant Examiner*.

U.S. Cl. X.R.

260—15, 6, 29.4, 855

UNITED STATES PATENT OFFICE
CERTIFICATE OF CORRECTION

Patent No. 3,428,607                                                   February 18, 1969

Alfred Renner

It is certified that error appears in the above identified patent and that said Letters Patent are hereby corrected as shown below:

Column 3, line 70, "490 ml" should read -- 4900 ml --. Columns 5 and 6, TABLE III, seventh column, line 4 thereof, "153" should read -- 143 --.

Signed and sealed this 7th day of April 1970.

(SEAL)
Attest:

Edward M. Fletcher, Jr.                              WILLIAM E. SCHUYLER, JR
Attesting Officer                                              Commissioner of Patents